(12) United States Patent
Andrews et al.

(10) Patent No.: US 11,461,629 B1
(45) Date of Patent: Oct. 4, 2022

(54) NEURAL NETWORK MODEL VISUALIZATION

(71) Applicant: Meta Platforms, Inc., Menlo Park, CA (US)

(72) Inventors: Pierre Yves Andrews, Mountain View, CA (US); Minsuk Brian Kahng, Menlo Park, CA (US); Aditya Rajkumar Kalro, Los Gatos, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 955 days.

(21) Appl. No.: 15/911,551

(22) Filed: Mar. 5, 2018

(51) Int. Cl.
*G06N 3/04* (2006.01)
*G06N 3/08* (2006.01)

(52) U.S. Cl.
CPC ............... *G06N 3/08* (2013.01); *G06N 3/04* (2013.01)

(58) Field of Classification Search
None
See application file for complete search history.

(56) References Cited

U.S. PATENT DOCUMENTS

2017/0193688 A1* 7/2017 Djorgovski ............ G06T 13/20

OTHER PUBLICATIONS

V. Vakharia, V. K. Gupta, & P. K. Kankar. A comparison of feature ranking techniques for fault diagnosis of ball bearing. Feb. 2015. Soft Comput (Year: 2016).*
Jiliang Tang, Salem Alelyani and Huan Liu. Feature Selection for Classification: A Review. 2014 (Year: 2014).*
Balazs Csanad Csáji. Approximation with Artificial Neural Networks. 2001 (Year: 2001).*
Grégoire Montavon, Wojciech Samek, Klaus-Robert Müller. Methods for interpreting and understanding deep neural networks. Oct. 2017. Elsevier. (Year: 2017).*
Adam W. Harley. An Interactive Node-Link Visualization of Convolutional Neural Networks. 2015. Springer. (Year: 2015).*

* cited by examiner

*Primary Examiner* — David R Vincent
(74) *Attorney, Agent, or Firm* — Fenwick & West LLP

(57) ABSTRACT

A model visualizer visualizes a neural network model at a neuron level. The model visualizer receives a plurality of instances comprising a plurality of features, and receives a neural network model comprising a plurality of layers, each layer comprising a plurality of neurons. For each neuron of each layer, the model visualizer selects a group of instances that highly activate that neuron to generate a summary feature vector, calculates an average feature value of the summary feature vector, compares each feature value of the summary feature vector with the average feature value, and assigns an attribute to each element of the summary feature vector based on the comparison. The model visualizer visualizes the received neural network model based on the assignment to each neuron.

21 Claims, 3 Drawing Sheets

300

Receive Plurality Of Data Item Instances, Each Data Item Instance Comprising Plurality Of Features
310

Retrieve Neural Network Model Comprising Plurality Of Layers, Each Layer Comprising Plurality Of Neurons
320

For Each Neuron Of Each Layer

Select Group Of Data Item Instances That Highly Activate Neuron To Generate Summary Feature Vector
330

Calculate Average Feature Value Of Summary Feature Vector
340

Compare Each Feature Value Of Summary Feature Vector With Average Feature Value
350

Assign Attribute To Each Element Of Summary Feature Vector Based On Comparison
360

Visualize Received Neural Network Model Based On Assignment To Each Neuron
370

FIG. 3

NEURAL NETWORK MODEL VISUALIZATION

BACKGROUND

This disclosure relates generally to model visualization, and more specifically to visualizing neural network models on client devices via assigning one or more attributes to each feature of each neuron of the neural network models.

A neural network model has multiple layers that are connected with each other. Each layer has multiple interconnected neurons (also referred to as nodes). A prediction process based on the neural network model requires large amounts of computations to compute weight for each neuron and for each connection. A complex structure of the neural network model and the prediction process result in high complexity of debugging and high usage of a processing unit (e.g., central processing unit, or a graphics processing unit). Generally, users select neural network models based on metrics (e.g., accuracy) without deeper understanding of these models and cannot readily identify how different characteristics of an input affect the internal neurons and connections. If the neural network model does not perform well, it is very time-consuming for users to find out causes and to figure out how to debug the neural network model.

SUMMARY

To better understand a neural network model, a model visualizer generates a model visualization that visualizes data-item instances, connections among the data-item instances, the neural network model at neuron level, and connections between the data-item instances and the neural network model. A data-item instance represents an input of a neural network model. Examples of a data-item instance include training data describing data with knowing an output for an input (e.g., data labeled with an expected output for an input), testing data describing data without knowing an output for an input. Each data-item instance may include a set of features (also referred to as a feature vector), each feature having a numerical value. The generated model visualization includes an instance view that visualizes the data-item instances and a model view that visualizes the neural network model at a neuron level.

In various embodiments, the model visualizer receives a plurality of data-item instances comprising a plurality of features, and receives a neural network model comprising a plurality of layers, each layer comprising a plurality of neurons. For each neuron of each layer, the model visualizer selects a group of data-item instances that highly activate that neuron to generate a summary feature vector. For example, for each neuron, the model visualizer ranks all the data-item instances associated with a neuron based on corresponding activation values (e.g., from the highest activation value to the lowest activation value), and a group of the data-item instances (e.g., top 5% of data-item instances) are selected as the data-item instances that highly activate that neuron. Feature values of the selected data-item instances are averaged to generate a summary feature vector. An activation value is an output generated by an activation function of a neuron given a data-item instance. The activation function determines whether a neuron is activated or not by a data-item instance. The model visualizer calculates an average feature value of the summary feature vector. For example, the model visualizer averages averaging feature values of the generated summary feature vector to generate an average feature value. The model visualizer compares each feature value of the summary feature vector with the average feature value, and assigns an attribute (e.g., a color, a shape, or a texture) to each element of the summary feature vector based on the comparison. For example, the model visualizer assigns a first attribute (e.g., a black color) to the greatest feature value among features values of the summary feature vector being greater than the average feature value, and assigns a second attribute (e.g., a white color) to the smallest feature value among the features values of the summary feature vector being smaller than the average feature value. The attribute assignment module 260 assigns a third attribute (e.g., a gray color) to a value between the greatest feature value and the smallest feature value. The model visualizer visualizes the received neural network model based on the assignment to each neuron.

In various embodiments, the model visualizer removes one or more data-item instances that are not highly activate one or more neurons.

BRIEF DESCRIPTION OF THE DRAWINGS

FIG. 3 is a flowchart illustrating a process for visualizing a neural network model, in accordance with an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Example of Neural Network Model Visualization

To better understand a neural network model, a model visualizer generates a model visualization that visualizes data-item instances, connections among the data-item instances, the neural network model at neuron level, and connections between the data-item instances and the neural network model. A data-item instance represents an input of a neural network model. Examples of a data-item instance include training data describing data with knowing an output for an input (e.g., data labeled with an expected output for an input), testing data describing data without knowing an output for an input. Each data-item instance may include a set of features (also referred to as a feature vector), each feature having a numerical value. The generated model visualization includes an instance view that visualizes the data-item instances and a model view that visualizes the neural network model at a neuron level, as further described below in FIG. 1.

Figure 1:
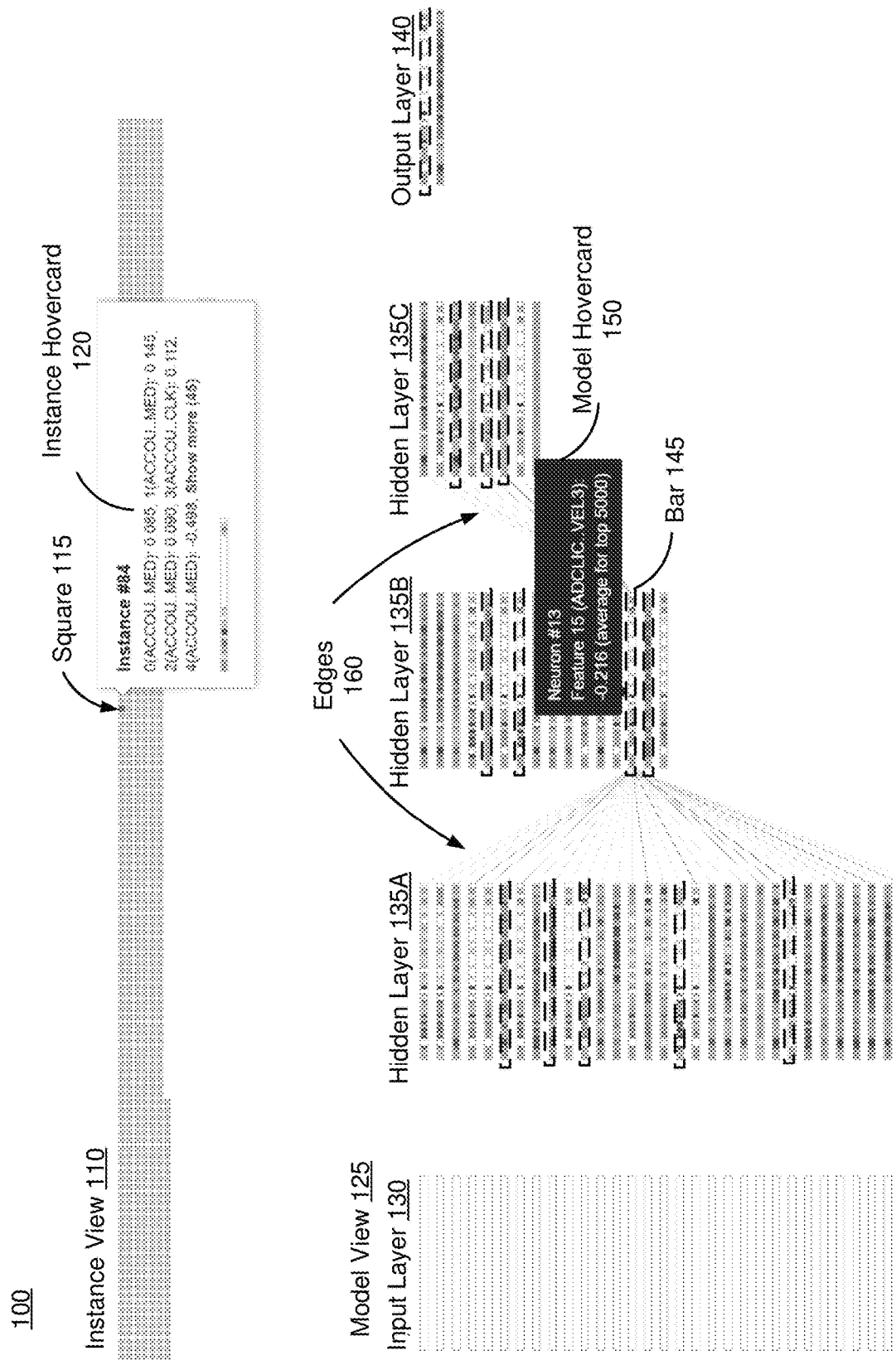
FIG. 1 is an example of a neural network model visualization, in accordance with an embodiment.

FIG. 1 is an example of a neural network model visualization 100, in accordance with an embodiment. In the embodiment of FIG. 1, the neural network model visualization 100 is generated and the visualization 100 includes an instance view 110 and a model view 125. The instance view 110 displays a plurality of data-item instances, each data-item instance having a plurality of features values. A feature value is a numerical value or a set of numerical values (e.g., a numerical vector) to represent a feature (e.g., user ID, timestamp, etc.). As shown in FIG. 1, the instance view 110 shows a plurality of gray squares. Each square represents a data-item instance. For example, a square 115 represents a data-item instance #84. If a user hovers over the square 115 in the instance view 110, an instance hovercard 120 displays 50 feature values of the data-item instance #84, and the model view 125 shows a few top neurons (marked by dash lines) that are highly activated by the data-item instance #84. For each data-item instance, neurons that are activated by a data-item instance are ranked based on corresponding activation values (e.g., from the highest activation value to the lowest activation value), and a group of neurons (e.g., a percentage of neurons that are activated by that instance) are selected as top neurons that are highly activated by that data-item instance. An activation value is an output generated by an activation function of a neuron given a data-item instance. The activation function determines whether a neuron is activated or not by a data-item instance. For example, if an activation value of a neuron is equal to or great than a threshold of activation value, that neuron is determined to be activated. If the activation value of a neuron is smaller than the threshold of activation value, that neuron is determined not to be activated. Examples of the activation function include step function, linear function, sigmoid function, Tan h function, and ReLu function.

The model view 125 displays the neural network model including an input layer 130, one or more hidden layers (e.g., 135A, 135B and 135C), an output layer 140, neurons of each layer, and edges 160 among the neurons. As shown in FIG. 1, the model view 125 shows data flow from left to right. Each columns represents a layer, and each bar (also referred to as an n-dimension vector) in the column represents a neuron that is associated with a set of features. For example, a bar 145 represents a neuron #13. The bar 145 includes 50 small rectangles, each representing a feature. For each neuron, all the data-item instances associated with a neuron are ranked based on their activation values (e.g., from the highest activation value to the lowest activation value), and a group of the data-item instances (e.g., top 5% of data-item instances) are selected as the data-item instances that highly activate that neuron. Feature values of the selected data-item instances are averaged to generate a summary feature vector that is represented by a bar (e.g., the bar 145). An average feature value is generated by averaging feature values of the generated summary feature vector. For each bar, a first color (e.g., a black color) is assigned to the greatest feature value among feature values being greater than the average feature value. A second color (e.g., a white color) is assigned to the smallest feature value among feature values being smaller than the average feature value. An intermediate color (e.g., a gray color) is assigned to a value between white and black. If the user hovers over the bar 145, a model hovercard 150 displays a neuron number (e.g., neuron #13), a feature number (e.g., feature 15) pointed by the user, and a feature value (e.g., −0.216). Additionally, a set of edges 160 connected to the bar 145 are displayed.

Overview of System Environment

Figure 2:
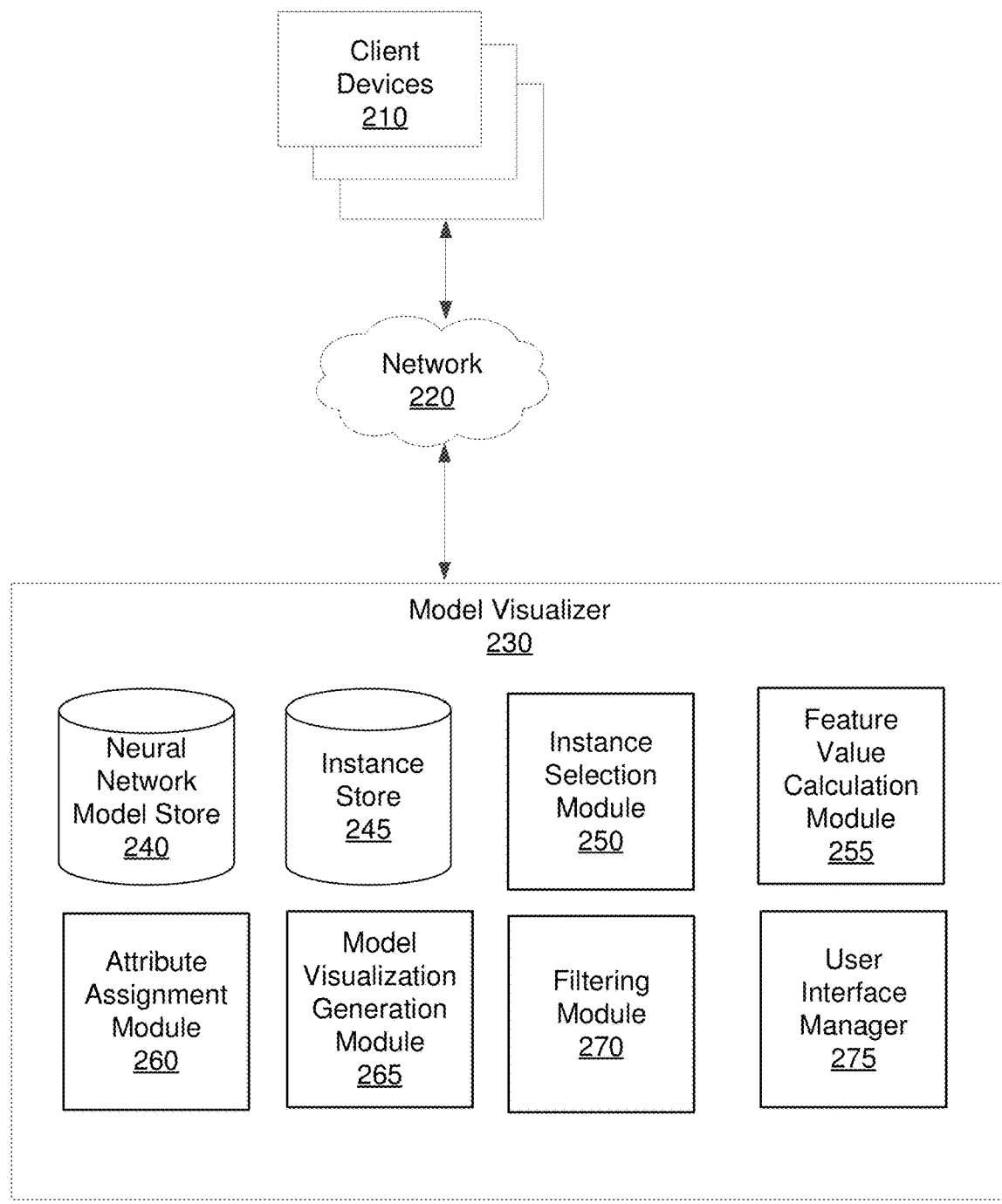
FIG. 2 is a system environment of a model visualizer, in accordance with an embodiment.

FIG. 2 is a system environment 200 of an model visualizer 230, in accordance with an embodiment. The system environment 200 shown by FIG. 2 comprises one or more client devices 210, a network 220, and the model visualizer 230. In alternative configurations, different and/or additional components may be included in the system environment 200.

The client devices 210 are one or more computing devices capable of receiving user input as well as transmitting and/or receiving data via the network 220. In one embodiment, the client device 210 is a conventional computer system, such as a desktop or laptop computer. Alternatively, the client device 210 may be a device having computer functionality, such as a personal digital assistant (PDA), a mobile telephone, a smartphone or another suitable device. The client device 210 is configured to communicate via the network 220. In one embodiment, the client device 210 executes an application allowing a user of the client device 210 to interact with the model visualizer 230. For example, the client device 210 executes a browser application to enable interaction between the client device 210 and the model visualizer 230 via the network 220. In another embodiment, the client device 210 interacts with the model visualizer 230 through an application programming interface (API) running on a native operating system of the client device 210, such as IOS® or ANDROID™.

The client devices 210 are configured to communicate via the network 220, which may comprise any combination of local area and/or wide area networks, using both wired and/or wireless communication systems. In one embodiment, the network 220 uses standard communications technologies and/or protocols. For example, the network 220 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 220 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 220 may be represented using any suitable format, such as hypertext markup language (HTML) or extensible markup language (XML). In some embodiments, all or some of the communication links of the network 220 may be encrypted using any suitable technique or techniques.

The model visualizer 230 generates a model visualization that visualizes data-item instances, connections among the data-item instances, the neural network model at a neuron level, and connections between the data-item instances and the neural network model. Examples of the connections include connections between a set of data-item instances and a set of neurons that are activated by the set of data-item instances, and connections among the set of neurons (e.g., edges of the set neurons). The model visualizer 230 allows users to interact with the generated model visualization. For example, the model visualizer 230 allows the users to filter out one or more data-item instances (e.g., training data) to better train the neural network model. In another example, the model visualizer 230 allows a user to input a neural network model and one or more data-item instances associated with the neural network model. The model visualizer 230 also allows the user to input several parameters to define the neural network model and data-item instances associated with the neural network model. Examples of parameters include a type of the neural network model (e.g., a neural network model for advertisement ranking, a neural network model of document classification), the number of layers of the neural network model, the number of neurons of the neural network model, weights of the neural network model, a type of an activation function of the neural network model, raw input data (also referred to as features, e.g., user ID, timestamp, etc.), feature values (e.g., numerical values transformed from the raw input data or numerical representation of the raw input data), input labels of the data-item instances, and a prediction score for each data-item instance. An example of the generated model visualization is shown in FIG. 1, and an example of the model visualizer is further described below.

Example of Model Visualizer

The model visualizer 230 shown in FIG. 2 includes a neural network model store 240, an instance store 245, an instance selection module 250, a feature value calculation module 255, an attribute assignment module 260, a model visualization generation module 265, a filtering module 270, and a user interface manager 275. In other embodiments, the model visualizer 230 may include additional, fewer, or different components for various applications. Conventional components such as network interfaces, security functions, load balancers, failover servers, management and network operations consoles, and the like are not shown so as to not obscure the details of the system architecture.

The neural network model store 240 stores one or more trained neural network models and parameters associated with each model. Examples of parameters include a type of a neural network model (e.g., a neural network model for advertisement ranking, a neural network model of document classification), the number of layers of a neural network model, the number of neurons of a neural network model, weights of a neural network model, a type of an activation function of a neural network model, and instructions associated with a neural network model (e.g., instructions for inputting features of the neural network model, instructions for processing an input and generating an output for the neural network model, etc.). The neural network model store 240 provides the models to the instance selection module 250 and the model visualization generation module 265.

The instance store 245 stores one or more data-item instances. In various embodiments, the instance store 245 also stores parameters associated with each data-item instance. Examples of parameters include raw input data (also referred to as features, e.g., user ID, timestamp, etc.), feature values (e.g., numerical values transformed from the raw input data or numerical representation of the raw input data), input labels of each training data and a prediction score for each training data. In some embodiments, the stored data-item instances are provided by users via the client device 210. The instance store 245 provides the data-item instances to the instance selection module 250 and the model visualization generation module 265.

The instance selection module 250 selects a group of data-item instances that highly activate neurons of a neural network model to generate a summary feature vector. For each neuron, all the data-item instances are ranked based on corresponding activation values generated by that neuron. For example, all the data-item instances are ranked from a data-item instance associated with the highest activation value to a data-item instance associated with the lowest activation value. A group of the data-item instances (e.g., top 5% of data-item instances or other percentage of data-item instances that activate that neuron) are selected as the instances that highly activate that neuron. The instance selection module 250 averages feature values of the selected data-item instances to generate the summary feature vector that represents that neuron. In various embodiments, for each data-item instance, neurons that are activated by that data-item instance are ranked based on corresponding activation values (e.g., from the highest activation value to the lowest activation value), and a group of neurons (e.g., a percentage of neurons that are activated by that data-item instance) are selected as top neurons that are highly activated by that instance. Examples are described above in FIG. 1.

The feature value calculation module 255 calculates an average feature value of the generated summary feature vector. For example, for each neuron, the feature value calculation module 255 averages feature values of the generated summary feature vector to generate an average feature value for that neuron.

The attribute assignment module 260 assigns an attribute to each feature of the generated summary feature vector based on a comparison between each feature value and the calculated average feature value of the generated summary feature vector. An attribute describes a representation of a feature such that each feature of the generated summary feature vector can be distinctive from each other. Examples of an attribute include a color, a shape and a texture. The attribute assignment module 260 assigns a first attribute (e.g., a black color) to the greatest feature value among features values of the summary feature vector being greater than the average feature value, and assigns a second attribute (e.g., a white color) to the smallest feature value among the features values of the summary feature vector being smaller than the average feature value. The attribute assignment module 260 assigns a third attribute (e.g., a gray color) to a value between the greatest feature value and the smallest feature value. An example is described above in FIG. 1. In various embodiments, the attribute assignment module 260 also assigns an attribute to each edge based on an edge's weight value. For example, the attribute assignment module 260 assigns a blue color to an edge with a positive weight value, assigns an orange color to an edge with a negative weight value, assigns a darker color to an edge with a larger absolute weight value, and assigns a light color to an edge with a smaller absolute weight value. In another example, as shown in FIG. 1, the attribute assignment module 260 assigns a darker gray color to an edge with a larger absolute weight value of the edges 160, and assigns a light gray color to an edge with a smaller absolute weight value of the edges 160.

The model visualization generation module 265 generates a model visualization including an instance view and a model view. Responsive to user input parameters received from the client device 210, the model visualization generation module 265 retrieves a neural network model from the neural network model store 240 and data-item instances from the instance store 245. In various embodiments, the instances are directly received from the client device 210.

The instance view visualizes data-item instances. For a binary-class model, the model visualization generation module 265 places the data-item instances based on their prediction scores. For example, negative and positive data-item instances are positioned in various ranges (e.g., 0%-10%, 10%-20%, and so forth) of prediction scores. In each range, negative and positive data-item instances are positioned from the highest prediction score to the lowest highest prediction score (or vice versa). The negative and positive data-item instances may be also marked by different attributes. For example, the negative data-item instances are marked by red, and the positive instances are marked by blue. For a multi-class model, the model visualization generation module 265 places data-item instances based on their true labels. For example, the data-item instances are classified based on their prediction results, and are positioned under a corresponding class. The data-item instances may be also marked by a specific attribute (e.g., green) indicating that a predicted result is accurate. If a user selects a data-item instance (e.g., hovering over a square in FIG. 1), the model visualization generation module 265 generates a data-item instance hovercard showing feature values of that data-item instance and/or a prediction score of that data-item instance.

The model view visualizes a neural network model at a neuron level. The model visualization generation module 265 visualizes each neuron using an assigned summary feature vector generated from the attribute assignment module 260. For a binary-class model, the assigned summary feature vector is based on the features of the model and has elements that are equal to the number of the features of the model. For example, as shown in FIG. 1, the model has 50 features. Each bar (also referred to as an assigned summary feature vector) has 50 small rectangles, each representing a feature. For a multi-class model, the assigned summary feature vector is based on a set of classes of the model and has elements that are equal to the number of classes. For example, if the multi-class model has 5 classes. Each bar has 5 small rectangles, each representing a class.

In various embodiments, in addition to the instance view and the model view, the model visualization generation module 265 also includes a group view. The group view visualizes a group of data-item instances that are selected based on one or more group criteria. Examples of a group criterion include selecting a group of data-item instances having features (e.g., input features, labels, or any intermediate outcomes in the neural network model) specified by a user via a client device or by the model visualization generation module 265, selecting a group of data-item instances having a regular expression (e.g. all sentences that contain "need a ride", or contain a word associated with a taxi company, etc.). The group view also shows activation patterns of the data-item instances of the group to facilitate comparison of activation patterns for multiple instances of the group. An activation pattern describes a pattern of neurons that are activated by one or more instances. In various embodiments, the model visualization generation module 265 sorts the activation patterns by a particular neuron, a particular data-item instance, or a particular group of data-item instances to facilitate comparison of activation patterns.

In various embodiments, the model visualization generation module 265 visualizes connections among layers and neurons. For example, if a user selects a neuron, the model visualization generation module 265 visualizes the most significant input and output weights with their connections to neurons in neighboring layers of the model.

A filter module 270 filters out one or more data-item instances to better train the neural network model. For example, the filter module 270 receives input parameters from the client device 210 to remove and/or select one or more data-item instances. In another example, the filter module 270 automatically remove and/or select one or more instances based on ranking data-item instances, e.g., removing one or more data-item instances that are not highly activate one or more neurons.

The user interface manager 275 manages a user interface to receive input parameters and data-item instances from the client device 210, and provides outputs of the model visualization generation module 265 to the client device 210.

Neural Network Model Visualization

FIG. 3 is a flowchart illustrating a process 300 for visualizing a neural network model, in accordance with an embodiment. The process 300 may be performed by the model visualizer 230. The process 300 include different or additional steps than those described in conjunction with FIG. 3 in some embodiments or perform steps in different orders than the order described in conjunction with FIG. 3.

The model visualizer 230 receives 310 plurality of data-item instances comprising plurality of features, and receives 320 a neural network model comprising plurality of layers, each layer comprising plurality of neurons. For each neuron of each layer, the model visualizer 230 selects 330 a group of data-item instances that highly activate that neuron to generate a summary feature vector. The model visualizer 230 calculates 340 an average feature value of the summary feature vector. The model visualizer 230 compares 350 each feature value of the summary feature vector with the average feature value. The model visualizer 230 assigns 360 an attribute to each element of the summary feature vector based on the comparison. The model visualizer 230 visualizes 370 the received neural network model based on the assignment to each neuron. Examples are described above in FIG. 1 and FIG. 2.

General

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a nontransitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a nontransitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method performed by a model visualizer, the method comprising:
   receiving a plurality of data-item instances, each data-item instance comprising a plurality of features;
   receiving a trained neural network model comprising a plurality of layers, each layer comprising a plurality of neurons, the plurality of layers coupled between an input layer and an output;
   displaying a user interface comprising a representation of the neural network model, the user interface showing one or more of the plurality of layers of the neural network model and a plurality of the neurons of the one or more layers;
   receiving a user selection of a neuron of the plurality of neurons on the user interface;
   for the selected neuron,
      selecting a subset of the plurality of data-item instances that highly activate the selected neuron;
      generating a summary feature vector comprising a set of elements, each element corresponding to a feature of the plurality of features of the data-item instances and comprising an average feature value of the corresponding feature of the selected subset of data-item instances;
      comparing each feature value of each element of the summary feature vector with the average feature value of the corresponding feature for the plurality of data-item instances; and
      assigning an attribute to each element of the summary feature vector based on the comparison; and
   responsive to the user selection of the selected neuron, displaying in the user interface one or more of the assigned attributes for the elements of the summary feature vector in connection with the selected neuron.

2. The computer-implemented method of claim 1, wherein selecting the subset of the plurality of data-item instances that highly activate the selected neuron comprises:
   ranking the received data-item instances based on corresponding activation values associated with that neuron; and
   selecting 5% of data-item instances as the data-item instances that highly activate that neuron.

3. The computer-implemented method of claim 2, wherein selecting the subset of the plurality of data-item instances that highly activate the selected neuron further comprises:
   averaging feature values of the selected data-item instances to generate the summary feature vector that represents that neuron.

4. The computer-implemented method of claim 1, further comprising for each data-item instance, selecting a group of neurons that are highly activated by that data-item instance based on corresponding activation values associated with that data-item instance.

5. The computer-implemented method of claim 1, wherein an attribute comprises a color, a shape, and a texture.

6. The computer-implemented method of claim 1, wherein the plurality of data-item instances comprise a plurality of training datasets.

7. The computer-implemented method of claim 1, wherein the plurality of data-item instances comprise a plurality of test datasets.

8. The computer-implemented method of claim 1, wherein assigning the attribute to each element of the summary feature vector based on the comparison comprises:
   assigning a first attribute to the greatest feature value among features values of the summary feature vector being greater than the average feature value;
   assigning a second attribute to the smallest feature value among the features values of the summary feature vector being smaller than the average feature value; and
   assigning a third attribute to a value between the greatest feature value and the smallest feature value.

9. The computer-implemented method of claim 1, further comprising assigning an attribute to each edge based on the edge's weight value.

10. The computer-implemented method of claim 1, wherein the neural network model is a binary-class model.

11. The computer-implemented method of claim 10, wherein displaying the assigned attributes comprises positioning the received data-item instances based on corresponding prediction scores.

12. The computer-implemented method of claim 10, wherein the summary feature vector has elements that are equal to the number of the features of the model.

13. The computer-implemented method of claim 1, wherein the neural network model is a multi-class model.

14. The computer-implemented method of claim 13, wherein displaying the assigned attributes comprises positioning the received data-item instances based on corresponding true labels.

15. The computer-implemented method of claim 13, wherein the summary feature vector has elements that are equal to the number of classes of the model.

16. The computer-implemented method of claim 9, wherein displaying the assigned attributes comprises displaying connections among layers and neurons.

17. The computer-implemented method of claim 2, further comprising removing one or more data-item instances of the received plurality of data-item instances based in part on the ranking, wherein the one or more data-item instances do not highly activate one or more neurons.

18. The computer-implemented method of claim 1, wherein displaying the assigned attributes further comprising displaying a group of data-item instances that are selected based on one or more group criteria.

19. A non-transitory computer-readable medium comprising computer program instructions that when executed by a computer processor of a model visualizer causes the processor to perform steps comprising:
   receiving a plurality of data-item instances, each data-item instance comprising a plurality of features;
   receiving a trained neural network model comprising a plurality of layers, each layer comprising a plurality of neurons, the plurality of layers coupled between an input layer and an output;
   displaying a user interface comprising a representation of the neural network model, the user interface showing one or more of the plurality of layers of the neural network model and a plurality of the neurons of the one or more layers;
   receiving a user selection of a neuron of the plurality of neurons on the user interface;
   for the selected neuron,
      selecting a subset of the plurality of data-item instances that highly activate the selected neuron;

generating a summary feature vector comprising a set of elements, each element corresponding to a feature of the plurality of features of the data-item instances and comprising an average feature value of the corresponding feature of the selected subset of data-item instances;

comparing each feature value of each element of the summary feature vector with the average feature value of the corresponding feature for the plurality of data-item instances; and assigning an attribute to each element of the summary feature vector based on the comparison; and responsive to the user selection of the selected neuron, displaying in the user interface one or more of the assigned attributes for the elements of the summary feature vector in connection with the selected neuron.

20. The non-transitory computer-readable medium of claim 19, wherein selecting the subset of the plurality of data-item instances that highly activate the selected neuron comprises:

ranking the received data-item instances based on corresponding activation values associated with that neuron; and selecting 5% of data-item instances as the data-item instances that highly activate that neuron.

21. The non-transitory computer-readable medium of claim 20, wherein selecting the subset of the plurality of data-item instances that highly activate the selected neuron further comprises:

averaging feature values of the selected data-item instances to generate the summary feature vector that represents that neuron.

* * * * *